United States Patent
Nakahara et al.

(10) Patent No.: US 7,515,976 B2
(45) Date of Patent: Apr. 7, 2009

(54) APPARATUS AND METHOD FOR ACQUIRING PLANT OPERATION DATA OF POWER PLANT

(75) Inventors: Yoshiki Nakahara, Fuchu (JP); Nobuyuki Sato, Fuchu (JP); Keiko Otani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 430 days.

(21) Appl. No.: 11/344,128

(22) Filed: Feb. 1, 2006

(65) Prior Publication Data

US 2006/0190095 A1    Aug. 24, 2006

(30) Foreign Application Priority Data

Feb. 21, 2005    (JP)    ............................. 2005-044808

(51) Int. Cl.
*G05B 9/02* (2006.01)
*G05B 11/01* (2006.01)
*G06F 7/00* (2006.01)
*G06F 17/30* (2006.01)
*G06F 12/00* (2006.01)
*G06F 11/00* (2006.01)

(52) U.S. Cl. ............................... 700/82; 700/17; 707/3; 707/7; 707/10; 707/204; 714/46; 714/57

(58) Field of Classification Search .................... 700/17, 700/79, 82, 95, 97, 117, 121, 286; 702/188; 705/7–9, 28; 707/1, 3, 7, 10, 200, 204; 709/217, 709/219, 233; 714/1, 2, 46, 48, 57
See application file for complete search history.

(56) References Cited

U.S. PATENT DOCUMENTS

| | | | | |
|---|---|---|---|---|
| 6,000,830 A * | 12/1999 | Asano et al. | ................. | 700/121 |
| 6,102,958 A * | 8/2000 | Meystel et al. | ................. | 703/2 |
| 6,493,675 B1 * | 12/2002 | Kanaya et al. | ................. | 705/7 |
| 6,618,647 B1 * | 9/2003 | Yamauchi | ................. | 700/286 |
| 6,658,374 B2 * | 12/2003 | Fujita et al. | ................. | 702/188 |
| 7,206,820 B1 * | 4/2007 | Rhoads et al. | ............. | 709/217 |
| 2003/0110116 A1 * | 6/2003 | Inubushi | ...................... | 705/36 |
| 2004/0107126 A1 * | 6/2004 | Kataoka et al. | ................. | 705/8 |

FOREIGN PATENT DOCUMENTS

| JP | 09037354 A | * | 2/1997 |
|---|---|---|---|
| JP | 9-319770 A | | 12/1997 |
| JP | 2001-175323 A | | 6/2001 |

* cited by examiner

*Primary Examiner*—Crystal J Barnes Bullock
(74) *Attorney, Agent, or Firm*—Foley & Lardner LLP

(57) ABSTRACT

There is disclosed a plant operation data acquiring apparatus, which acquires and stores plant operation data, and backs up the plant operation data using a backup storage medium in accordance with a backup request. The plant operation data acquiring apparatus combines the plant operation data with a simple data search program for controlling a computer to realize a simple data search function of simply searching the plant operation data when executing backup processing, and backs up then using the backup storage medium.

4 Claims, 12 Drawing Sheets

APPARATUS AND METHOD FOR ACQUIRING PLANT OPERATION DATA OF POWER PLANT

CROSS-REFERENCE TO RELATED APPLICATIONS

This application is based upon and claims the benefit of priority from prior Japanese Patent Application No. 2005-044808, filed Feb. 21, 2005, the entire contents of which are incorporated herein by reference.

BACKGROUND OF THE INVENTION

1. Field of the Invention

The present invention relates generally to a plant operation data acquiring apparatus, and more particularly, to the apparatus for managing a history of plant operation data of a power plant.

2. Description of the Related Art

In a power plant, a history of plant operation data is stored for a long term, and then, graphic display and various analyses have been made using the plant operation data. The foregoing analyses results are used to grasp degradation tendency of power plant facilities and variations of operating characteristic, and to make a plan to repair facilities (equipments).

Conventionally, a plant operation data acquiring apparatus using a hard disk drive has been proposed as the apparatus for storing the history of plant operation data (e.g., see JPN. PAT. APPLN. KOKAI Publications No. 9-319770 and No. 2001-175323).

Such a plant operation data acquiring apparatus has a limit of storable data because there is a limit to the storage capacity of a hard disk drive for storing plant operation data. For this reason, plant operation data exceeding the limit of the storage capacity of a hard disk drive is backed up using other storage medium for backup. Part of data stored in the hard disk drive is deleted to secure an area for newly storing plant operation data in the hard disk drive.

However, the foregoing conventional plat operation data acquiring apparatus has the following problem. Specifically, in order to display backup data stored in other storage medium for backup, data must be restored from the backup storage medium to the hard disk drive every display. Thereafter, the backup data is displayed using a data search function of the plat operation data acquiring apparatus itself.

For this reason, it is impossible to directly search and display plant operation data from the storage medium backing up the plant operation data. Therefore, it is difficult to effectively use backup data.

BRIEF SUMMARY OF THE INVENTION

An object of the present invention is to provide a plant operation data acquiring apparatus, which can directly search and display plant operation data from a storage medium backing up the plant operation data.

According to one aspect of the present invention, there is provided a plant operation data acquiring apparatus managing a history of plant operation data of a control computer controlling a plant operation, comprising:

a plant operation data acquiring unit receiving and acquiring plant operation data transmitting from the control computer;

a plant operation data storage unit storing a history of the acquired plant operation data;

a data search unit searching the plant operation data stored in the plant operation data acquiring unit;

a simple data search program storage unit controlling a computer, and storing a simple data search program for realizing a simple data search function of simply searching the plant operation data; and a data backup unit executing data backup processing for backing up the plant operation data stored in the plant operation data acquiring unit and the simple data search program stored in the simple data search program storage unit using a backup storage medium.

According to the present invention, the above-mentioned apparatus backs up the simple data search program for realizing a simple data search function of simply searching the plant operation data using the backup storage medium together with the plant operation data. The foregoing configuration is provided, and thereby, it is possible to directly search plant operation data from the backup storage medium backing it up, and to display the data.

DETAILED DESCRIPTION OF THE INVENTION

Embodiments of the present invention will be described below with reference to the accompanying drawings.

FIRST EMBODIMENT

Figure 1:
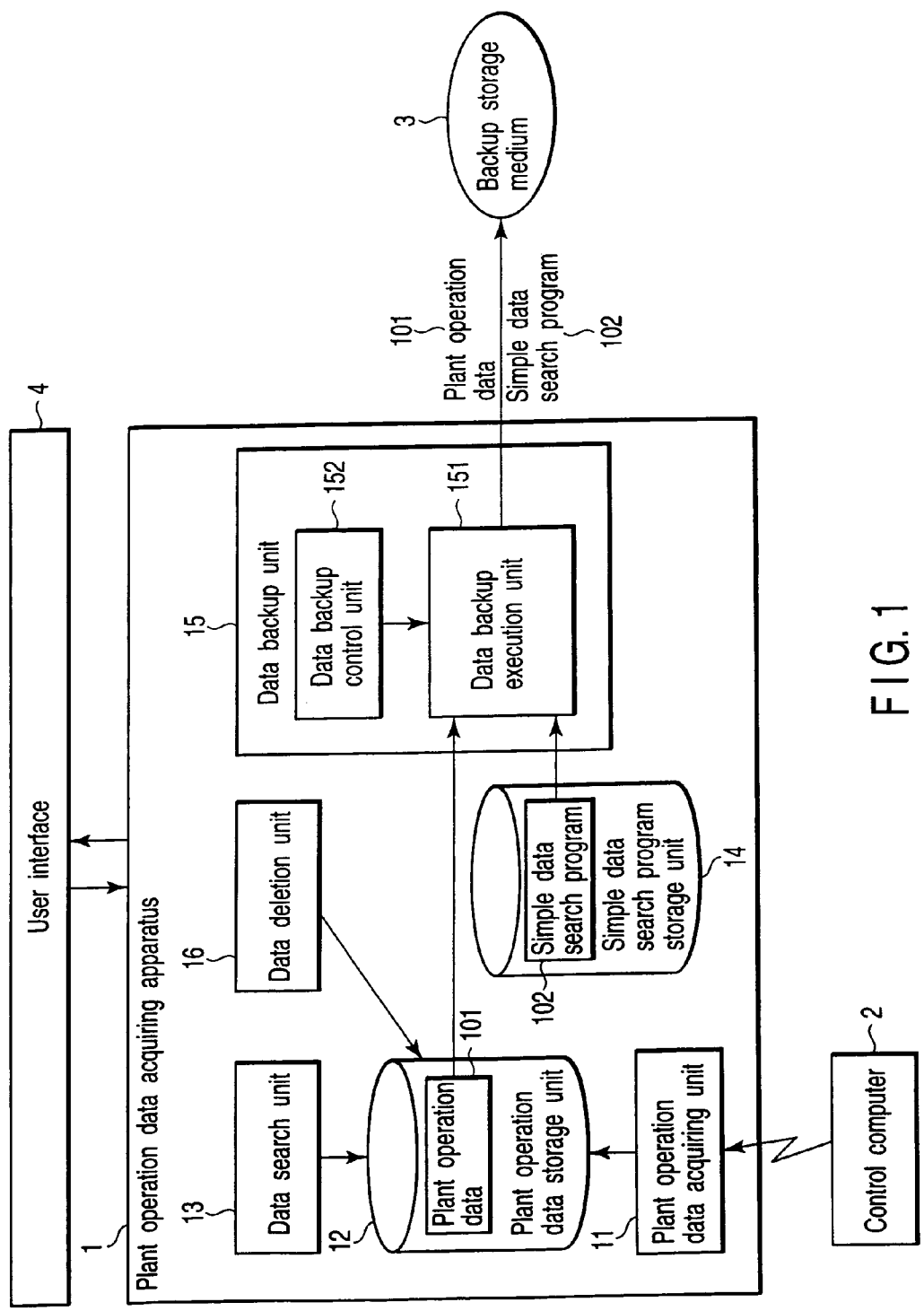
FIG. 1 is a block diagram showing the configuration of a plant operation data acquiring apparatus according to a first embodiment of the present invention.

FIG. 1 is a block diagram showing the configuration of a plant operation data acquiring apparatus according to a first embodiment.

As shown in FIG. 1, a plant operation data acquiring apparatus 1 according to this embodiment manages a history of plant operation data of a control computer 2 for controlling the operation of a target plant such as power plant. Moreover, the apparatus 1 has a data backup function of backing up plant operation data using the use of a backup storage medium 3.

The foregoing apparatus 1 includes the following units given as the basic configuration for managing a history of plant operation data. One is a plant operation data acquiring unit 11 for receiving and acquiring plant operation data 101 transmitted from the control computer 2. Another is a plant operation data storage unit 12 for storing a history of the acquired plant operation data 101. Another is a data search unit 13 for searching the plant operation data stored in the storage unit 12 in accordance with a search request from user.

The foregoing apparatus 1 further includes simple data search program storage unit 14 and data backup unit 15 to realize the preceding data backup function, in addition to the basic configuration described above. The simple data search program storage unit 14 is a unit stored with a simple data search program 102. The simple data search program 102 controls computers (other than the apparatus 1) to realize the simple data search function of simply searching the plant operation data 101. Incidentally, the program 102 is previously stored in the storage unit 14 via a preparatory work before the apparatus 1 is normally operated.

The data backup unit 15 is a unit for taking the following data backup procedure. According to the data backup procedure, plant operation data 101 and simple data search program 102 stored in storage units 12 and 14 are backed up using the backup storage medium 3 in accordance with a backup request from user.

The data backup unit 15 further includes data backup execution unit 151 and data backup control unit 152 as a subunit. The data backup execution unit 151 mainly executes the data backup procedure. The data backup control unit 152 gives execution instructions to the unit 151 so that the unit 151 starts the data backup procedure, when receiving a backup request from user.

The foregoing apparatus 1 further includes a data deletion unit 16. The data deletion unit 16 deletes backed-up plant operation data 101 from the plant operation data storage unit 12 in accordance with a deletion request from user.

Incidentally, the foregoing plant operation data acquiring apparatus 1 is realized by controlling a personal computer or various computers having high performance using software specialized in acquiring plant operation data. Moreover, the plant operation data acquiring apparatus 1 receives various instructions such as search request from user and input data via a user interface 4. Then, the apparatus 1 is configured to display or output various data processing results such as search result in accordance with user's search request.

The user interface 4 is composed of various input units such as keyboard and mouse usually included in the computer and various output unit such as display.

(Operation of the Apparatus 1)

Figure 2:
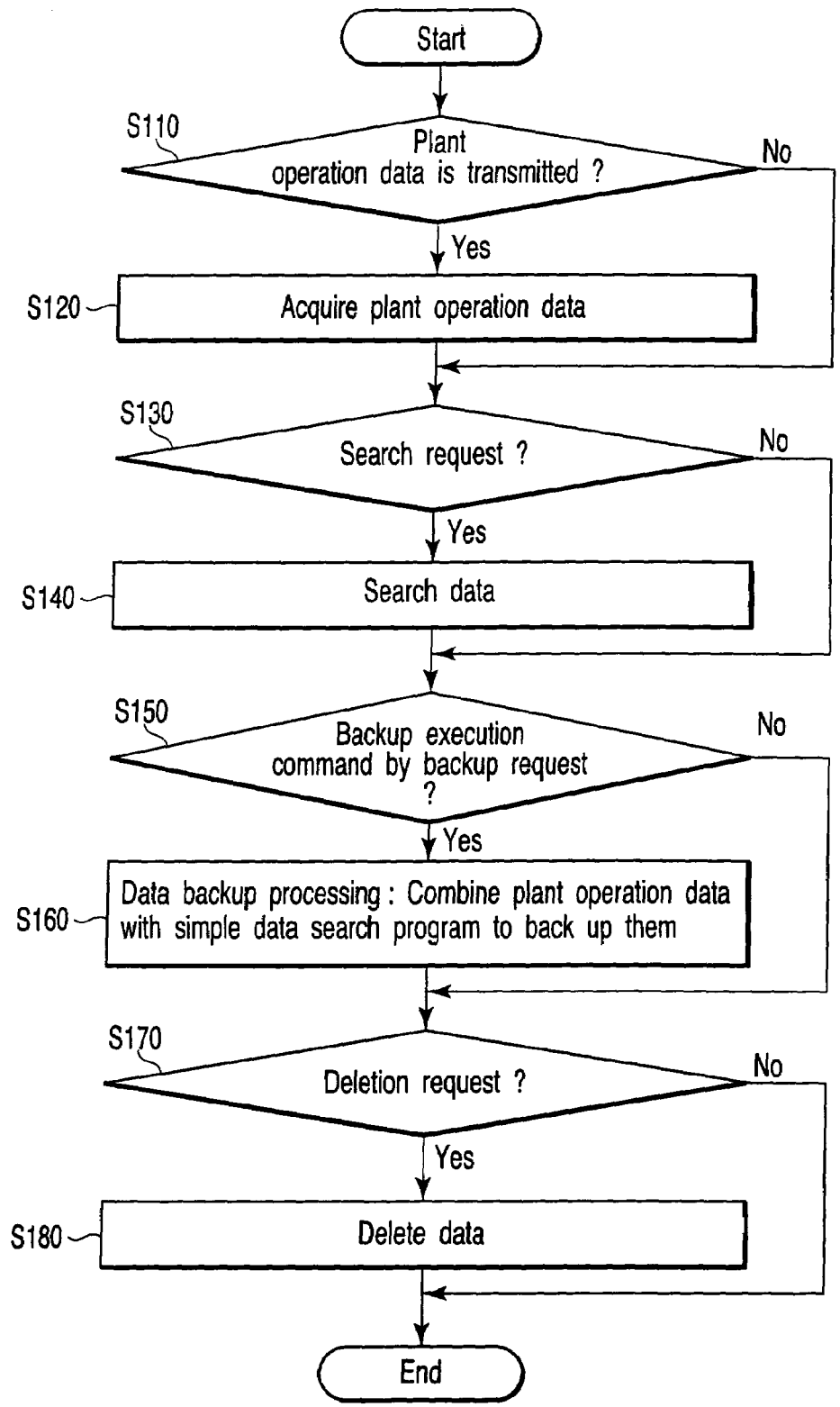
FIG. 2 is a flowchart to explain the procedure of a normal operation of the plant operation data acquiring apparatus according to the first embodiment.

FIG. 2 is a flowchart to explain the procedure of a normal operation of the plant operation data acquiring apparatus according to the first embodiment.

The plant operation data acquiring apparatus 1 makes the following operation in a normal operation. As depicted in FIG. 2, the plant operation data acquiring unit 11 receives and acquires plant operation data 101 every when the data 101 is periodically transmitted from the control computer 2 (step S110, YES). Then, the data acquiring unit 11 stores a history of the acquired plant operation data 101 in the storage unit 12 (step S120).

The data search unit 13 executes data search in accordance with a search request from user via the user interface 4 (YES in step S130, S140). The data search unit 13 searches plant operation data stored in the plant operation data storage unit 12, and thereafter, outputs the search result to user via the user interface 4.

When accepting a backup request from user via the user interface 4, the apparatus 1 executes data backup processing (YES in step S150, S160). Specifically, in accordance with the backup request from user, the data backup control unit 152 gives a data backup execution command to the data backup execution unit 151 (YES in step S150). The unit 151 starts data backup processing in accordance with the backup execution command. That is, the data backup execution unit 151 fetches plant operation data 101 and simple data search program 102 individually stored in storage units 12 and 14. Then, the unit 151 combines data 101 and program 102 thus fetched, and thereafter, backs up (stores) those in (using) the backup storage medium 3 (step S160).

After the foregoing data backup processing is executed, the data deletion unit 16 of the apparatus 1 executes data deletion if a deletion request is made from user via the user interface 4 (YES in step S170, S180). The data deletion unit 16 deletes the plant operation data 101 stored in the plant operation data storage unit 12 in response to the deletion request.

According to the foregoing first embodiment, if general-purpose computers other than the apparatus 1 fetch the plant operation data 101 from the backup storage medium 3, they simultaneously fetch the simple data search program 102 combined with the data 101. By doing so, the general-purpose computers build up a simple data search function realized by the simple data search program 102.

Therefore, the general-purpose computers can make the following operation although usually have no data search unit for plant operation data. Specifically, the general-purpose computers can directly search the plant operation data stored in the backup storage medium 3 without restoring the data to the plant operation data storage unit 12 of the apparatus 1. In other words, the general-purpose computers can directly search the plant operation data stored in the backup storage medium 3 using the simple data search function realized by the simple data search program 102.

SECOND EMBODIMENT

Figure 3:
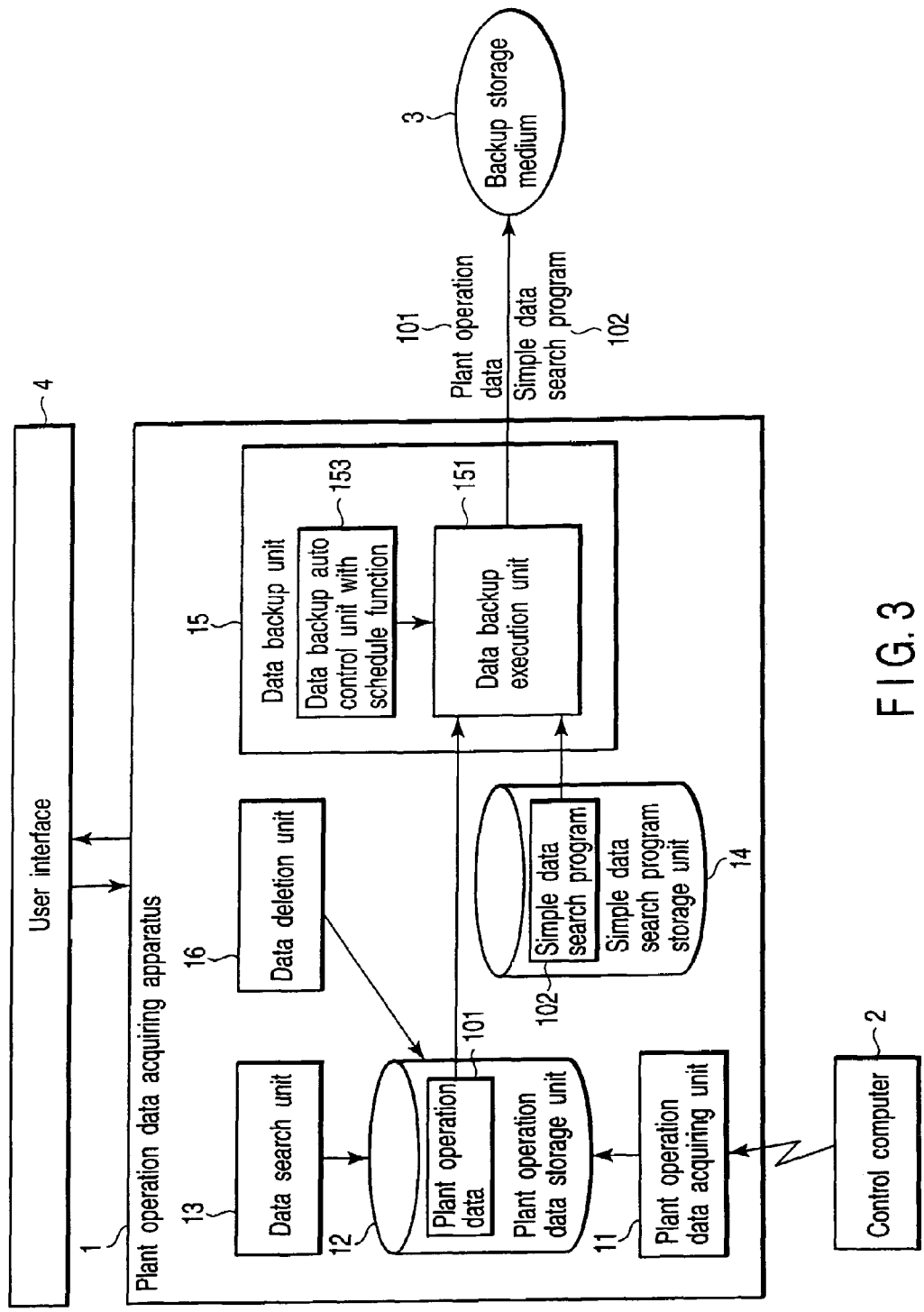
FIG. 3 is a block diagram showing the configuration of a plant operation data acquiring apparatus according to a second embodiment of the present invention.

FIG. 3 is a block diagram showing the configuration of a plant operation data acquiring apparatus according to a second embodiment. As seen from FIG. 3, the plant operation data acquiring apparatus 1 of the second embodiment differs from the apparatus 1 of the first embodiment in that the configuration of the data backup unit 15 is changed.

According to the second embodiment, a data backup auto control unit 153 with schedule function is provided in place of the control unit 152 giving an execution command to the execution unit 151 when receiving a backup request from user. The unit 153 automatically gives an execution command to the data backup execution unit 151 in accordance with a preset data backup execution schedule.

Other configurations are the same as the first embodiment; therefore, the details are omitted.

Figure 4:
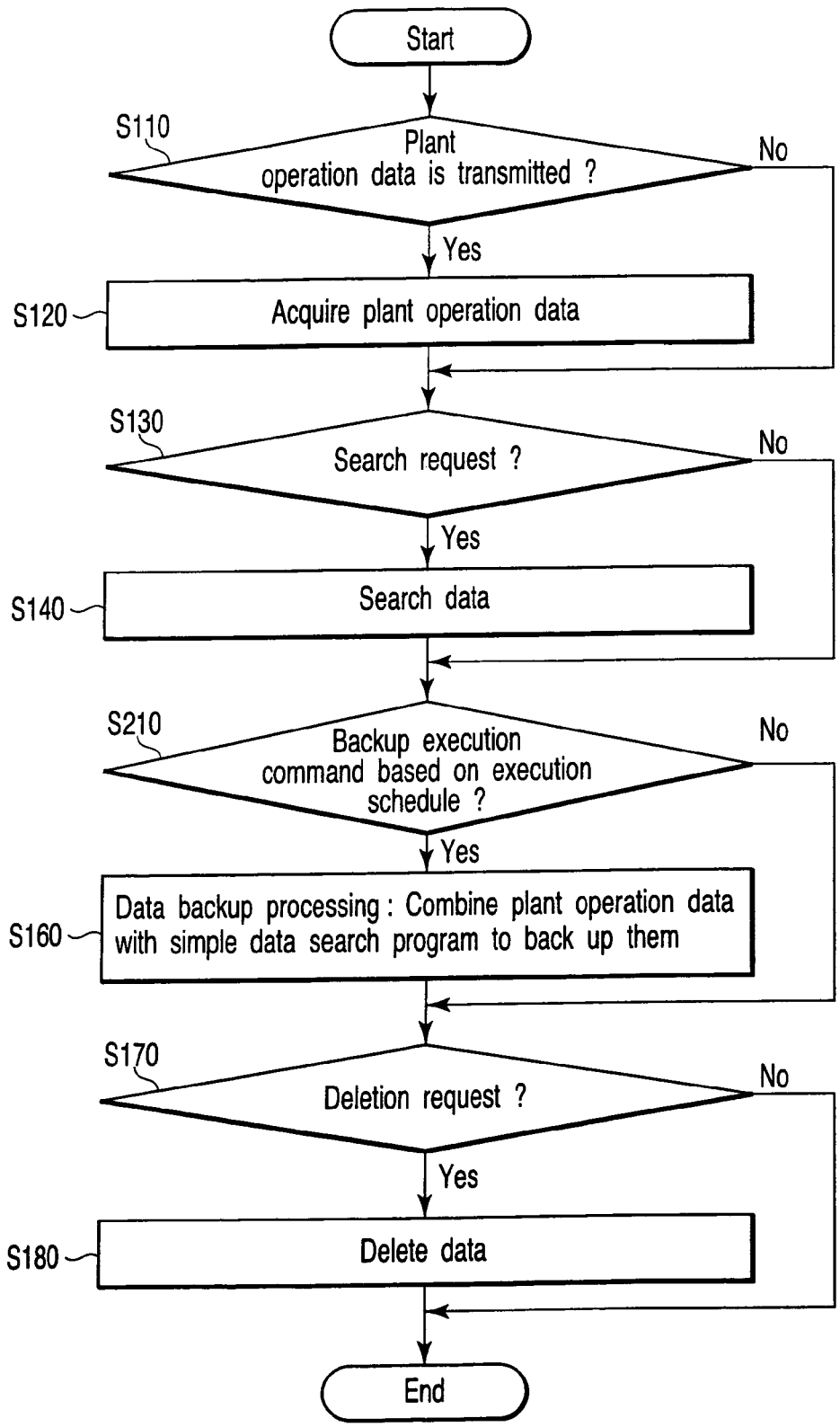
FIG. 4 is a flowchart to explain the procedure of a normal operation of the plant operation data acquiring apparatus according to the second embodiment.

FIG. 4 is a flowchart to explain the procedure of a normal operation of the plant operation data acquiring apparatus 1 according to the second embodiment.

In the second embodiment, the operation procedures of steps S110 to S140, S170 and S180 are the same as the first embodiment shown in FIG. 2.

According to this second embodiment, a data backup execution command is given every when backup execution timing comes based on a preset execution schedule, and not backup request from user (YES in step S210). Specifically, the data backup auto control unit 153 with schedule function gives a data backup execution command to the data backup execution unit 151 according to the preset execution schedule.

The data backup execution unit 151 executes data backup processing in accordance with the backup execution command (step S160).

The following settings are possible in the execution schedule preset in the data backup auto control unit 153 with schedule function. Specifically, an execution timing default value may be set in the initial state in addition to fixedly preset schedule. The execution timing may be properly changed based on the instruction received from user via the user interface 4.

According to the foregoing second embodiment, the following effects are obtained in addition to the effect of the first embodiment described above.

Specifically, plant operation data is automatically backed up every when a backup execution timing comes according to the preset execution schedule. Thus, user has no need to make an operation of the backup request every when a backup execution timing comes. Therefore, this serves to reduce user's load spent for backup execution. Moreover, it is possible to prevent a generation of disadvantage such that data backup is not executed at a necessary timing resulting from user's operation mistake. As a result, reliability is improved in the data backup function of the plant operation data acquiring apparatus 1.

(Modification Example of Second Embodiment)

According to the modification example, the data backup auto control unit 153 with schedule function has the following configuration. That is, the unit 153 has a function of accepting a backup request from user like the data backup control unit 151 of the first embodiment. The foregoing configuration is provided, and thereby, the data backup auto control unit 153 can always accept an arbitrary backup request from user in according to the execution schedule. Therefore, this is applicable to the following case. For example, user judges that data backup is necessary soon in emergency case regardless of the execution schedule. In this case, user gives a backup request to the data backup unit 15 when the foregoing case is generated, and thereby, the unit 15 executes data backup processing soon.

THIRD EMBODIMENT

Figure 5:
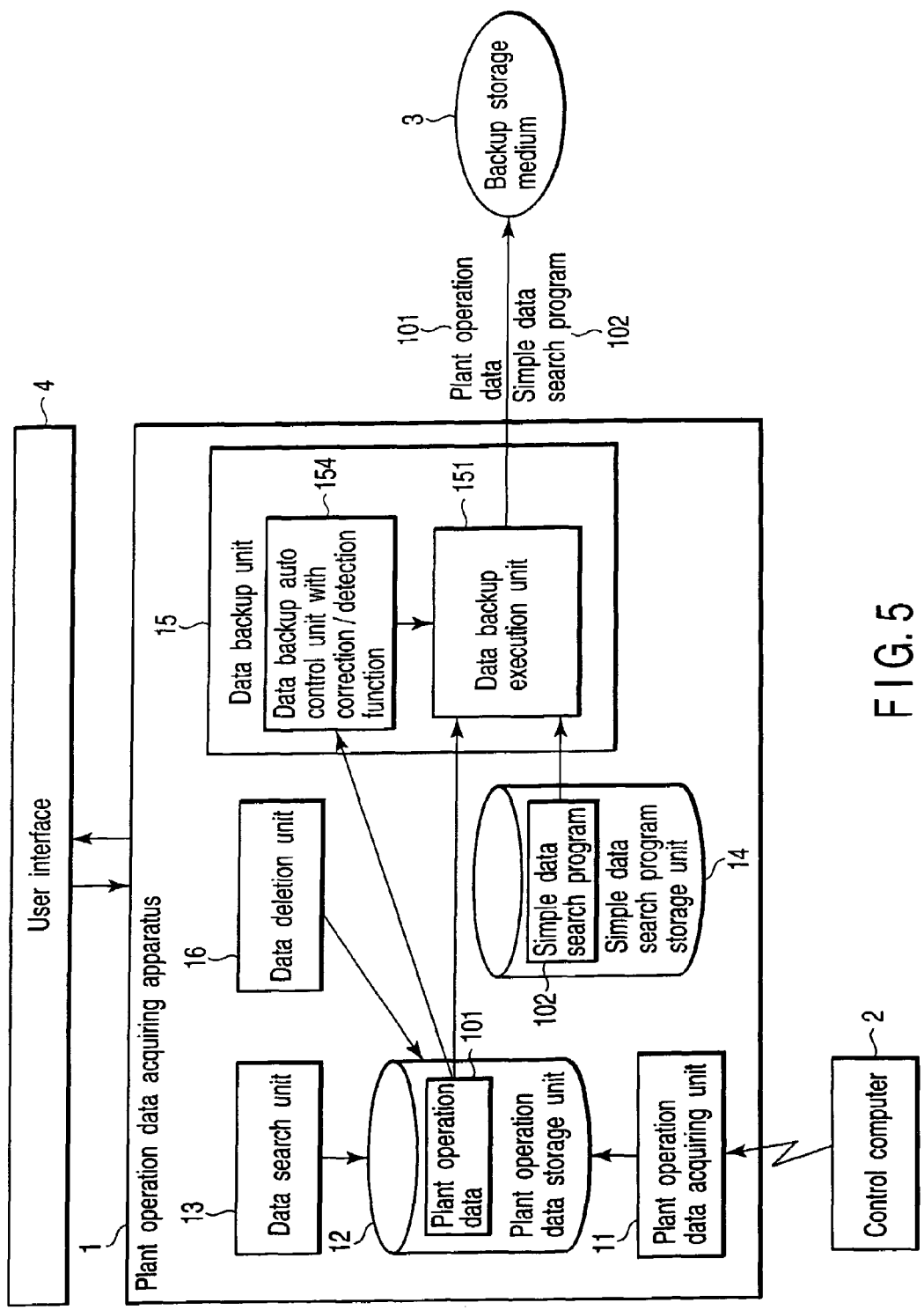
FIG. 5 is a block diagram showing the configuration of a plant operation data acquiring apparatus according to a third embodiment of the present invention.

FIG. 5 is a block diagram showing the configuration of a plant operation data acquiring apparatus according to a third embodiment.

As seen from FIG. 5, the plant operation data acquiring apparatus 1 of the third embodiment differs from the apparatus 1 of the first embodiment in that the configuration of the data backup unit 15 is changed.

According to the third embodiment, a data backup auto control unit 154 with correction/detection function is provided in place of the data backup control unit 152. The unit 154 has a function of detecting whether or not plant operation data 101 stored in the storage unit 12 is corrected, in addition to the function of accepting a backup request from user.

Other configurations are the same as the first embodiment; therefore, the details are omitted.

Figure 6:
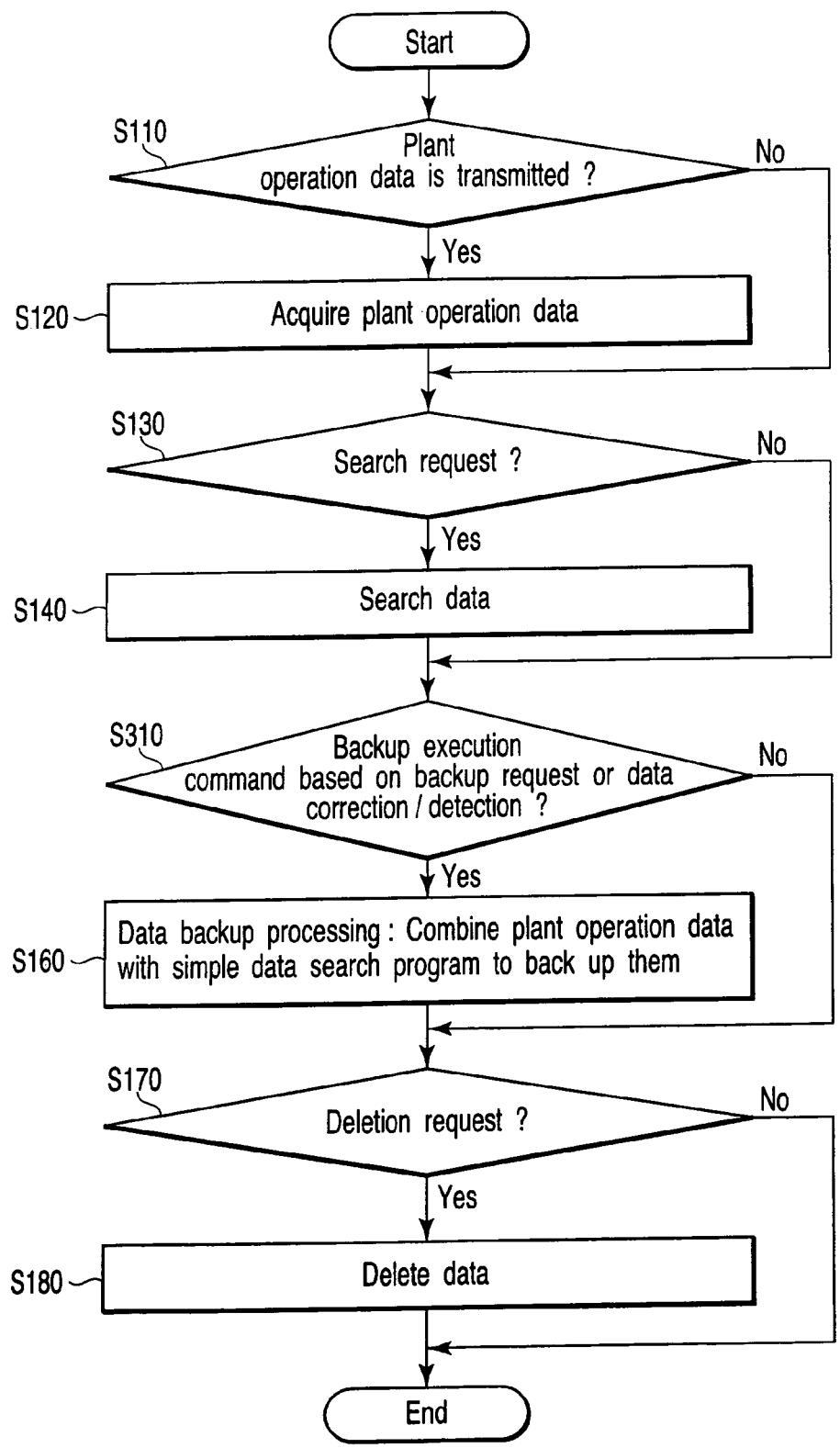
FIG. 6 is a flowchart to explain the procedure of a normal operation of the plant operation data acquiring apparatus according to the third embodiment.

FIG. 6 is a flowchart to explain the procedure of a normal operation of the plant operation data acquiring apparatus 1 according to the third embodiment.

In the third embodiment, the operation procedures of steps S110 to S140, S170 and S180 are the same as the first embodiment shown in FIG. 2.

As depicted in FIG. 6, a data backup execution command is given to the data backup execution unit 151 in addition to a backup request from user if the plant operation data 101 stored in the storage unit 12 is corrected (YES in step S310). Specifically, the data backup auto control unit 154 with correction/detection function detects data correction, and then, gives a data backup execution command to the data backup execution unit 151.

The data backup execution unit 151 executes data backup processing according to the backup execution command (step S160).

Incidentally, the correction/detection function of the unit 154 is readily realizable using existing various data monitor/comparison methods. For example, if the plant operation data 101 stored in the storage unit 12, information showing correction is given to the corrected plant operation data 101. Moreover, the data backup auto control unit 154 with correction/detection function unit monitors correction information of the plant operation data 101. By doing so, data correction is readily detectable based on the correction information.

According to the foregoing third embodiment, the following effects are further obtained in addition to the effect of the first embodiment described above. Specifically, according to a backup request from user, data backup processing is carried out with respect to the plant operation data 101 stored in the storage unit 12. Thereafter, correction data of the plant operation data 101 is again sent from the control computer, and thereby, there is a possibility that any corrections are added to the stored plant operation data 101.

In such a case, the unit 154 of the third embodiment automatically detects data correction of the plant operation data stored in the storage unit 12, and then, automatically executes data backup processing with respect to the corrected data. Therefore, if the plant operation data stored in the storage unit 12 is corrected, it is possible to securely back up the corrected plant operation data. This serves to improve reliability of the data backup function of the plant operation data acquiring apparatus 1.

FOURTH EMBODIMENT

Figure 7:
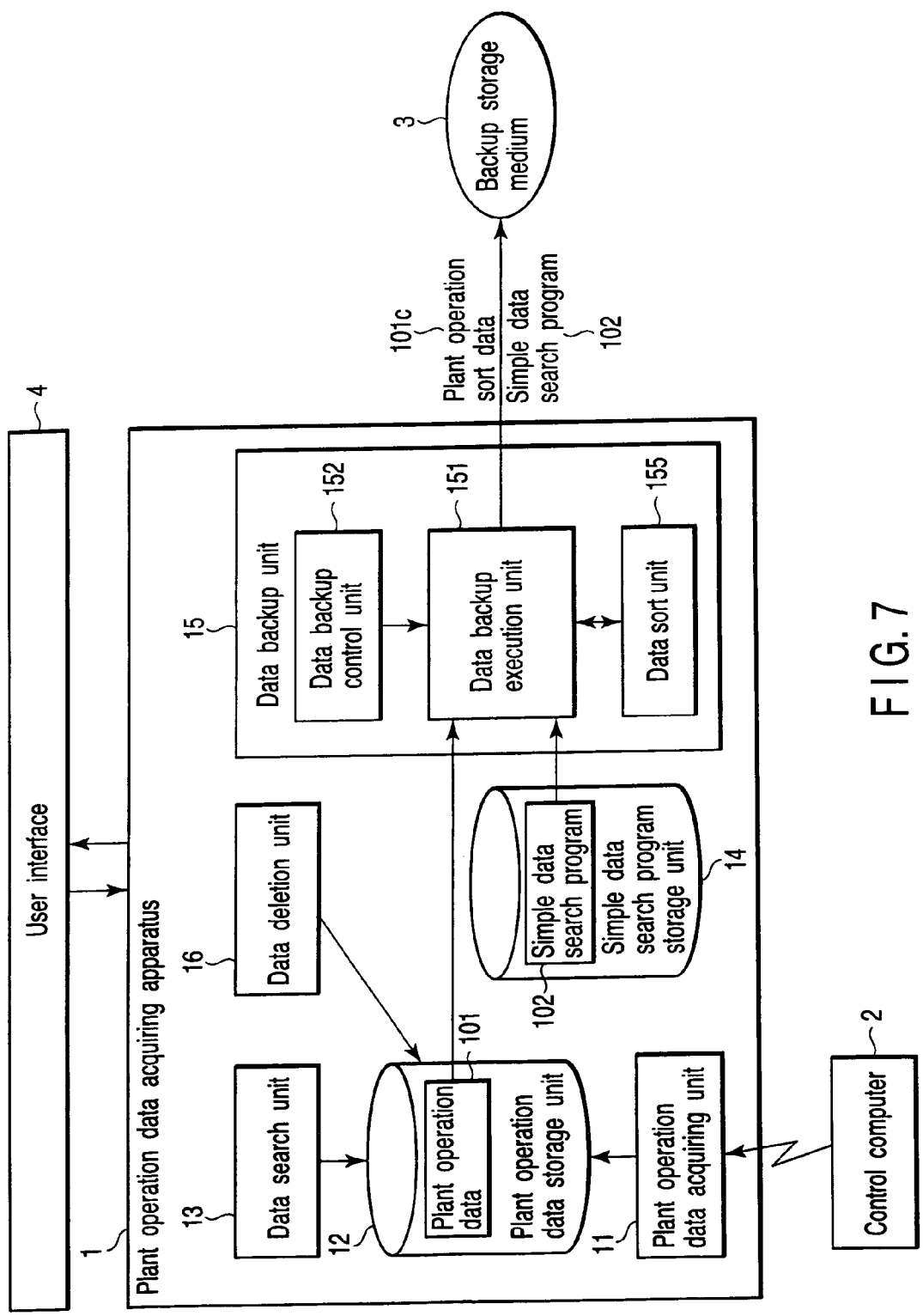
FIG. 7 is a block diagram showing the configuration of a plant operation data acquiring apparatus according to a fourth embodiment of the present invention.

FIG. 7 is a block diagram showing the configuration of a plant operation data acquiring apparatus according to a fourth embodiment.

As seen from FIG. 7, the plant operation data acquiring apparatus 1 of the fourth embodiment differs from the apparatus 1 of the first embodiment in that the configuration of the data backup unit 15 is changed.

According to the fourth embodiment, the data backup unit 15 includes a data sort unit 155. The data sort unit 155 sorts backup plant operation data 101 in accordance with sort information including any of the following contents when executing data backup processing. The contents are plant unit relevant to the plant operation data 101, data item, data classification and term.

Other configurations are the same as the first embodiment; therefore, the details are omitted.

Figure 8:
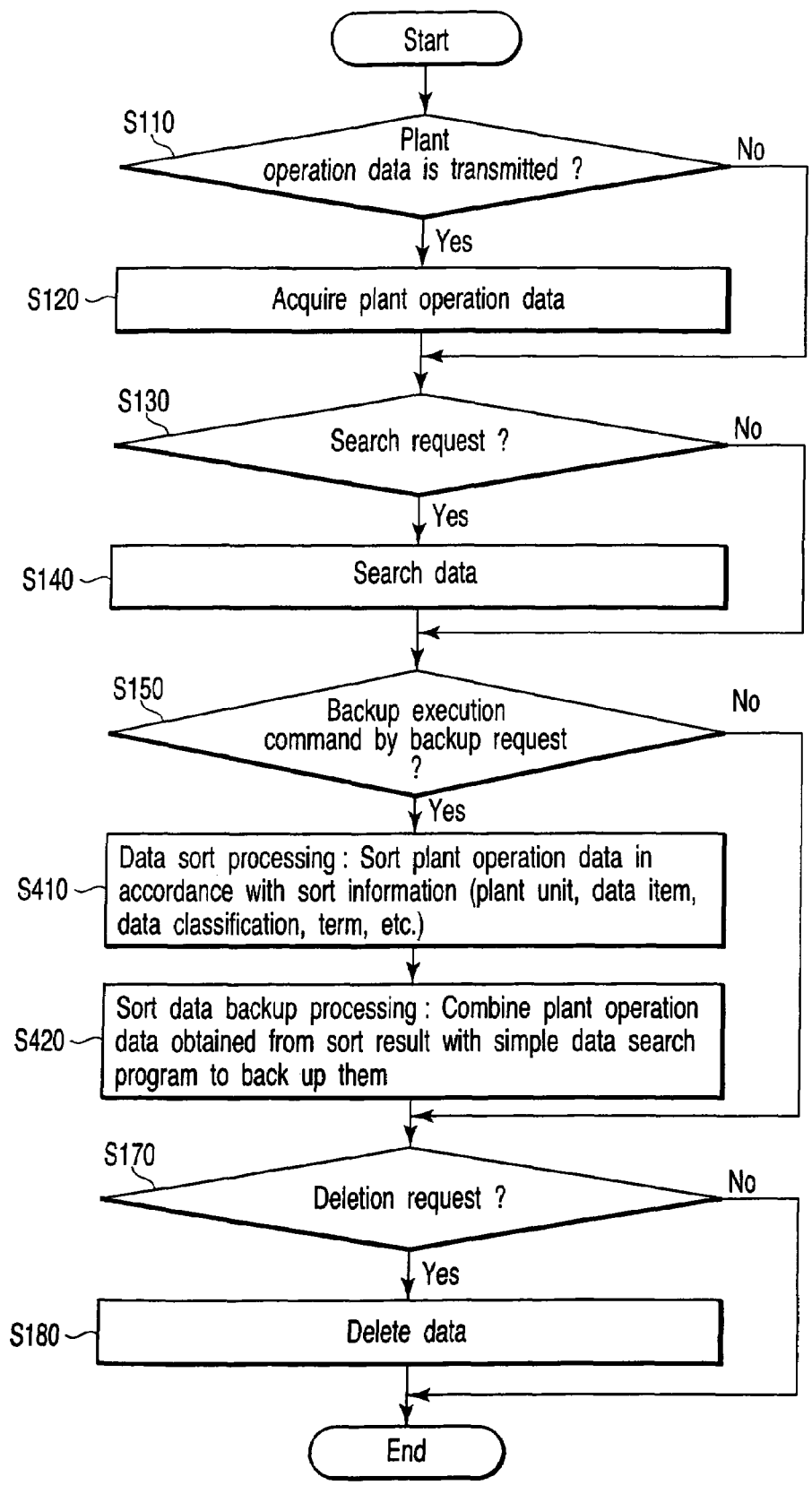
FIG. 8 is a flowchart to explain the procedure of a normal operation of the plant operation data acquiring apparatus according to the fourth embodiment.

FIG. 8 is a flowchart to explain the procedure of a normal operation of the plant operation data acquiring apparatus 1 according to the fourth embodiment.

In the fourth embodiment, the operation procedures of steps S110 to S140, S170 and S180 are the same as the first embodiment shown in FIG. 2.

As shown in FIG. 8, the data backup execution unit 151 starts up the data sort unit 155 according to a data backup execution command from the data backup control unit 152 receiving a backup request from user (YES in step S150).

The data sort unit 155 executes data sort processing for sorting plant operation data 101 sent from the unit 151 in accordance with sort information including any of plant unit, data item, data classification and term (step S410). The data backup execution unit 151 executes sort data backup processing with respect to data thus sorted (step S420).

The data backup execution unit 151 takes the following procedure as sorted data backup processing. Specifically, the unit 151 combines plant operation data 101c obtained from the result of data sort processing by the data sort unit 155 with simple data search program 102, and then, backs up them in the backup storage medium 3 (step S420).

Other operation procedures are the same as the first embodiment shown in FIG. 2 excluding data backup.

According to the fourth embodiment, the following effects are further obtained in addition to the effect of the first embodiment. Specifically, the plant operation data 101 is sorted into sort information including any of-plant unit relevant to the plant operation data 101, data item, data classification and term. The sorted plant operation data 101c is backed up using the backup storage medium 3. This serves to configure more readily usable database as compared with the case of simply backing up data using the backup storage medium 3. Therefore, usability is improved in data stored in the backup storage medium 3.

FIFTH EMBODIMENT

Figure 9:
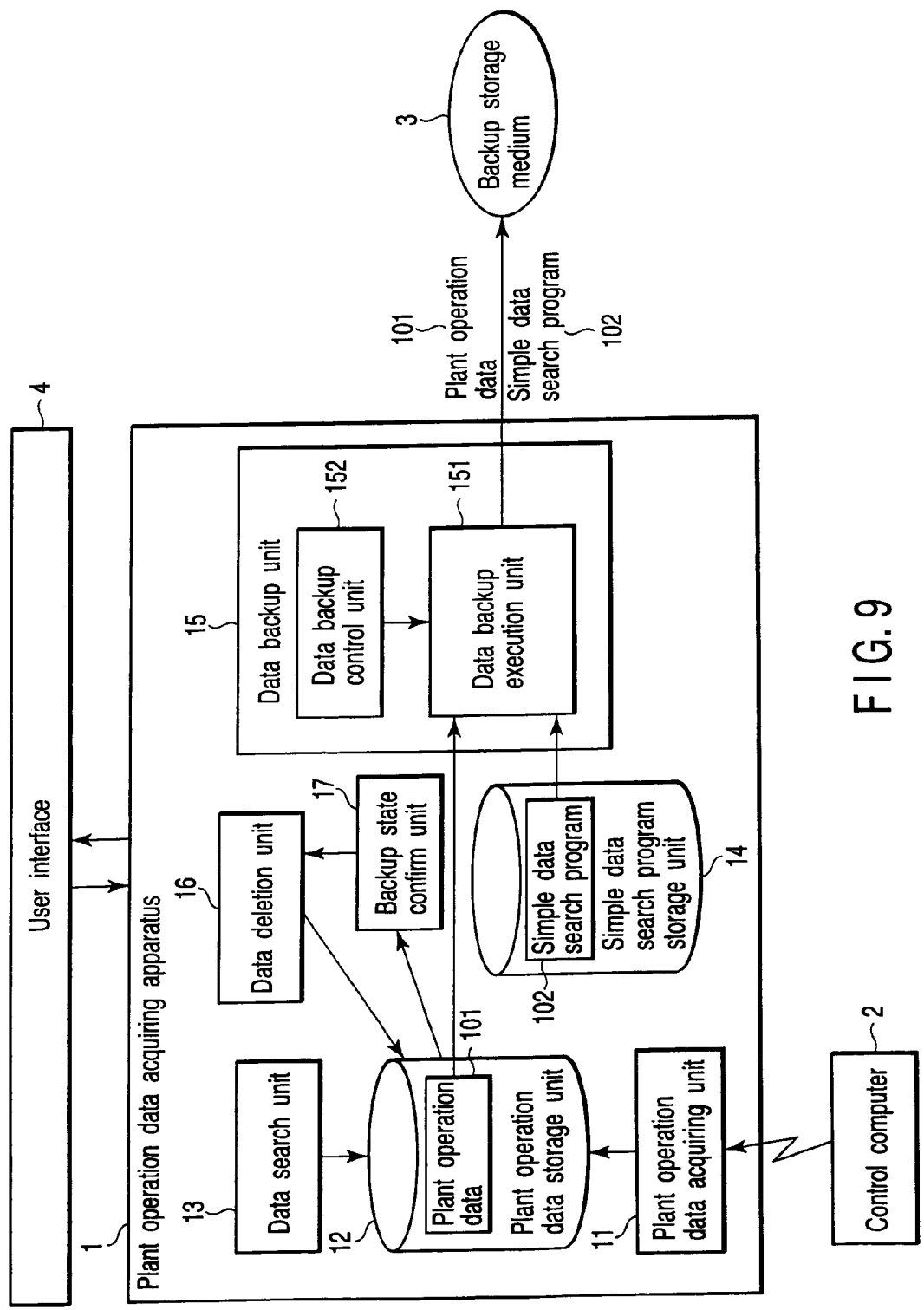
FIG. 9 is a block diagram showing the configuration of a plant operation data acquiring apparatus according to a fifth embodiment of the present invention.

FIG. 9 is a block diagram showing the configuration of a plant operation data acquiring apparatus according to a fifth embodiment.

As seen from FIG. 9, the plant operation data acquiring apparatus 1 of the fifth embodiment differs from the apparatus 1 of the first embodiment in that a backup state confirm unit 17 is further provided. The unit 17 confirms whether or not data backup of the plant operation data 101 deleted by the data deletion unit 16 is executed. The backup state confirm unit 17 stops data deletion if the foregoing data backup is not executed.

Other configurations are the same as the first embodiment; therefore, the details are omitted.

Figure 10:
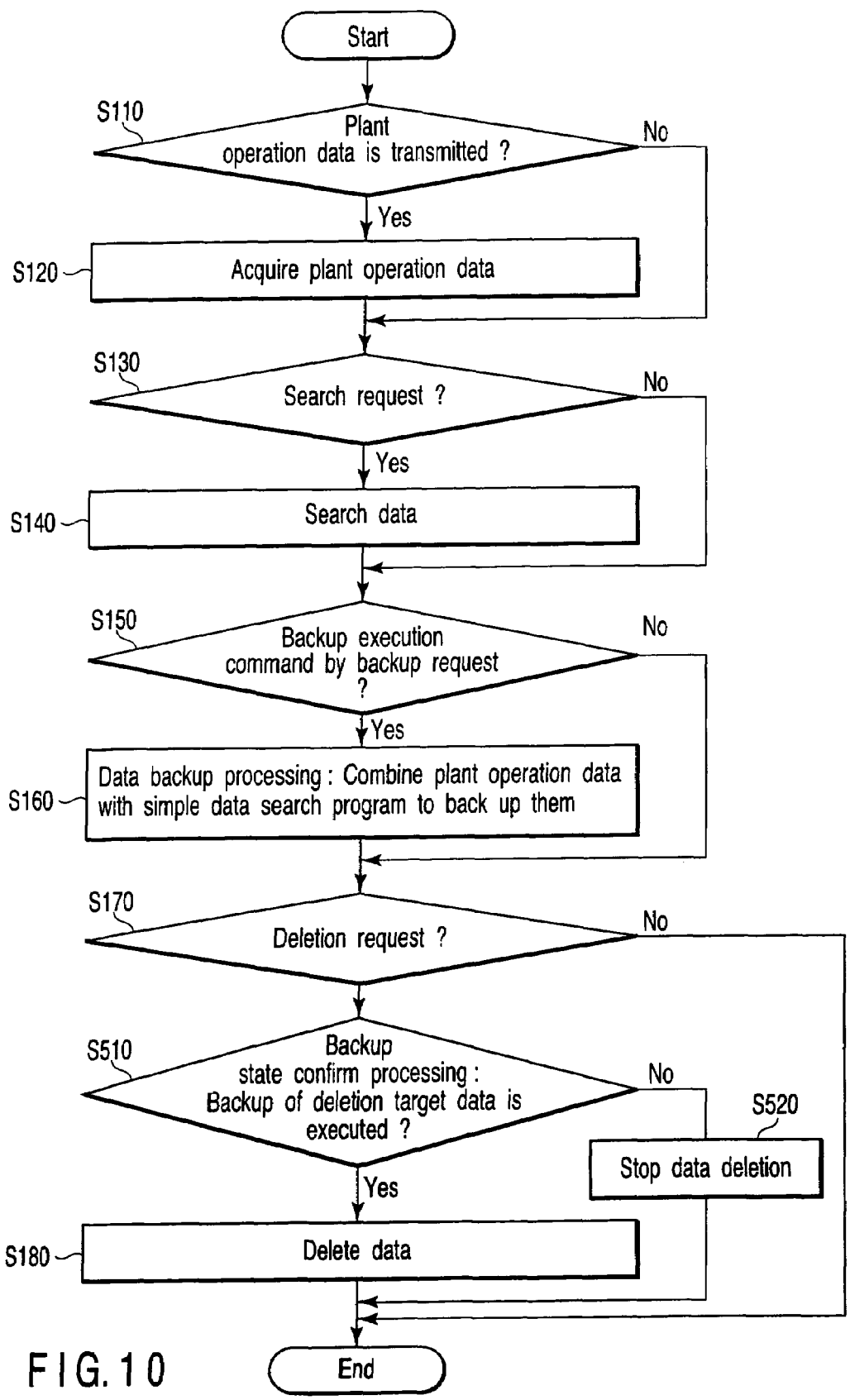
FIG. 10 is a flowchart to explain the procedure of a normal operation of the plant operation data acquiring apparatus according to the fifth embodiment.

FIG. 10 is a flowchart to explain the procedure of a normal operation of the plant operation data acquiring apparatus 1 according to the fifth embodiment.

In the fifth embodiment, the operation procedures of steps S110 to S160 are the same as the first embodiment shown in FIG. 2.

As shown in FIG. 10, if a delete request from user is given, the backup state confirm unit 17 confirms whether data backup is executed with respect to plant operation data 101 stored in the storage unit 12 specified as a delete target (YES in step S170, S510).

If data backup of the delete target, that is, plant operation data 101 is executed, the backup state confirm unit 17 gives a data deletion command of the plant operation data 101 to the data deletion unit 16 (YES in S510). The data deletion unit 16 deletes the plant operation data 101 from the plant operation data storage unit 12 according to the data deletion command (step S180).

On the other hand, if data backup of the delete target, that is, plant operation data 101 is not executed, the unit 17 gives a data deletion stop command of the plant operation data 101 to the data deletion unit 16 (NO in step S510). The unit 16 stops data deletion of the plant operation data 101 according to the data deletion stop command (step S520). By doing so, data delete processing based on the data deletion command is avoided.

Other operation procedures are the same as the first embodiment shown in FIG. 2 excluding data backup.

The backup state confirm function of the unit 17 is readily realizable using existing various data monitoring/comparison methods. For example, if data backup of the plant operation data 101 stored in the storage unit 12, backup execution information showing that data backup is already executed is given to the plant operation data 101. The backup state confirm unit 17 monitors the backup execution information of the plant operation data 101. By doing so, it is possible to readily confirm whether or not backup is executed, according to the backup execution information.

According to the fifth embodiment, the following effects are obtained in addition to the effect of the first embodiment. Specifically, for example, user gives a delete request with respect to plant operation data 101 executing no data backup in error. However, even if the foregoing case is given, the backup state confirm unit 17 can securely prevent the plant operation data 101 executing no data backup from being deleted. Therefore, this serves to improve reliability of the data backup function in the plant data acquiring apparatus 1.

SIXTH EMBODIMENT

Figure 11:
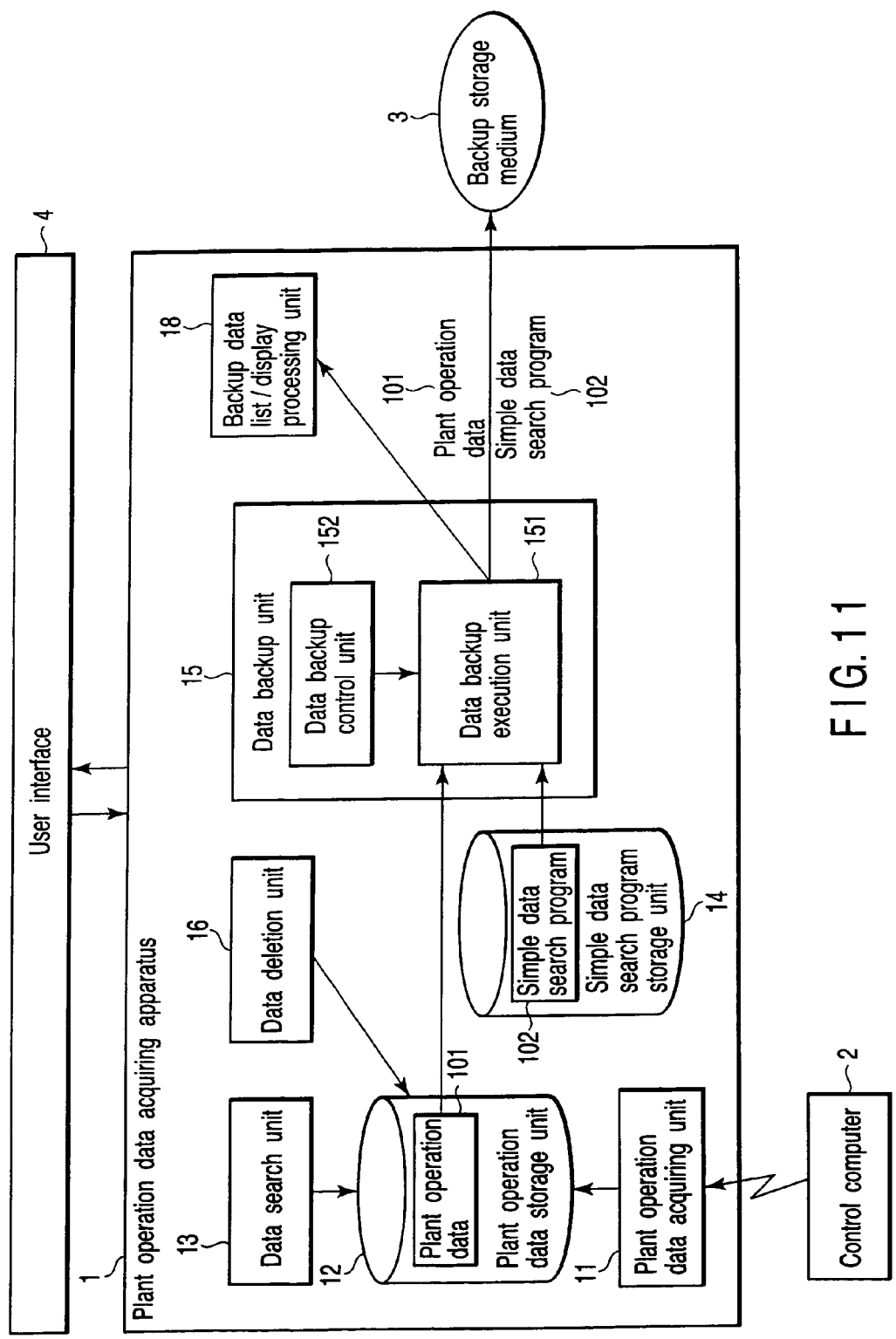
FIG. 11 is a block diagram showing the configuration of a plant operation data acquiring apparatus according to a sixth embodiment of the present invention.

FIG. 11 is a block diagram showing the configuration of a plant operation data acquiring apparatus according to a sixth embodiment.

As seen from FIG. 11, the plant operation data acquiring apparatus 1 of the sixth embodiment differs from the apparatus 1 of the first embodiment in that a backup data list/display unit 18 is further provided. When data backup of the plant operation data 101 is executed, the unit 18 executes processing of listing and displaying the details of the backed-up plant operation data.

Other configurations are the same as the first embodiment; therefore, the details are omitted.

Figure 12:
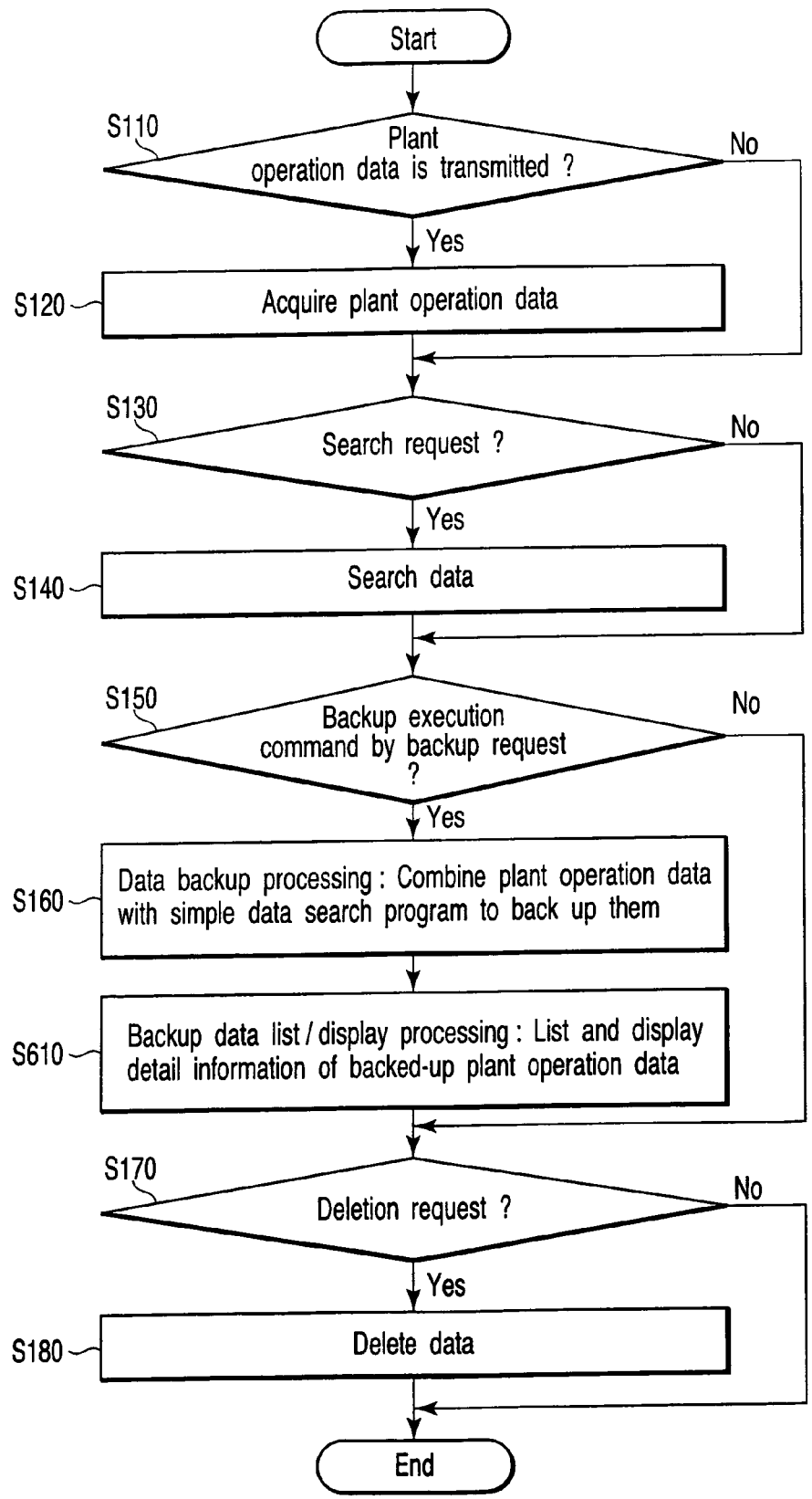
FIG. 12 is a flowchart to explain the procedure of a normal operation of the plant operation data acquiring apparatus according to the sixth embodiment.

FIG. 12 is a flowchart to explain the procedure of a normal operation of the plant operation data acquiring apparatus 1 according to the sixth embodiment.

In the sixth embodiment, the operation procedures of steps S110 to S160, S170 and S180 are the same as the first embodiment shown in FIG. 2.

As shown in FIG. 12, if data backup processing of the plant operation data 101 is executed, the data backup execution unit 151 transfers information relevant to the processing to the backup data list/display processing unit 18 (step S160).

The unit 18 lists the detail information of the backed-up plant operation data 101 using received information. Then, the unit 18 displays the detail information to user in a predetermined display form via the user interface 4 (step S610).

In this case, the listed and displayed detail information of the plant operation data 101 includes plant unit relevant to the plant operation data 101, data item, data classification and term.

Other operation procedures are the same as the first embodiment shown in FIG. 2 excluding processing of listing and displaying backup data.

According to the sixth embodiment, the following effects are obtained in addition to the effect of the first embodiment. Specifically, when data backup of the plant operation data 101 is executed, the detail information is listed and displayed to user. Therefore, user can readily and visibly confirm the details of data backup execution contents.

For example, if data backup of part of the plant operation data is not executed, user confirms the fact, and thereafter, can make a backup request with respect to the plant operation data, which is not backed up. Y doing so, data backup is securely achieved with respect to all of plant operation data. Therefore, this serves to improve reliability of the data backup function in the plant data acquiring apparatus 1.

OTHER EMBODIMENT

The configuration of the plant operation data acquiring apparatus of the foregoing embodiments and each unit configuring the apparatus, procedure and processing contents are not limited. In other words, the configuration, procedure and processing contents are freely changeable so long as simple data search program for realizing the simple data search function of simply searching plant operation data is backed up using the backup storage medium together with plant operation data.

The foregoing embodiments are suitable to the plant operation data acquiring apparatus, which manages a history of plant operation data of a power plant. Besides, the present invention is applicable to various industrial plants, which have a need to manage a history of plant operation data of a chemical plant.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plant operation data acquiring apparatus managing a history of plant operation data of a control computer controlling a plant operation, comprising:
   a plant operation data acquiring unit receiving and acquiring plant operation data transmitting from the control computer;
   a plant operation data storage unit storing a history of the acquired plant operation data;
   a data search unit searching the plant operation data stored in the plant operation data storage unit;
   a simple data search program storage unit controlling a computer, and storing a simple data search program for realizing a simple data search function of simply searching the plant operation data; and
   a data backup unit executing data backup processing for backing up the plant operation data stored in the plant operation data storage unit and the simple data search program stored in the simple data search program storage unit using a backup storage medium,
   wherein when executing data backup of the plant operation data stored in the plant operation data storage unit, the data backup unit sorts the plant operation data in accordance with sort information including any of plant unit relevant to the data, data item, data classification and term, and thereafter, backs up the sorted result using the backup storage medium.

2. A plant operation data acquiring apparatus managing a history of plant operation data of a control computer controlling a plant operation, comprising:
   a plant operation data acquiring unit receiving and acquiring plant operation data transmitting from the control computer;
   a plant operation data storage unit storing a history of the acquired plant operation data;
   a data search unit searching the plant operation data stored in the plant operation data storage unit;
   a simple data search program storage unit controlling a computer, and storing a simple data search program for realizing a simple data search function of simply searching the plant operation data;
   a data backup unit executing data backup processing for backing up the plant operation data stored in the plant operation data storage unit and the simple data search program stored in the simple data search program storage unit using a backup storage medium;
   a data deletion unit deleting the plant operation data stored in the plant operation data storage unit; and
   a backup state confirm unit,
   the backup state confirm unit confirming whether or not data backup of the plant operation data by the data backup unit is executed before the data deletion unit deletes the plant operation data stored in the plant operation data storage unit, and stopping data deletion of the plant operation data by the data deletion unit if data backup is not executed.

3. A plant operation data acquiring method of managing a history of plant operation data of a control computer controlling a plant operation, comprising:
   receiving and acquiring plant operation data transmitting from the control computer;
   storing a history of the acquired plant operation data in the plant operation data storage unit;
   searching the plant operation data stored in the plant operation data storage unit; and
   combining the plant operation data searched from the plant operation data storage unit with a simple data search program for controlling a computer to realize a simple data search function of simply searching the plant operation data in accordance with a backup request, and backing up then using a backup storage medium,
   wherein the backup step includes sorting the plant operation data in accordance with sort information including any of plant unit relevant to the data, data item, data classification and term, and thereafter, backing up the sorted result using the backup storage medium, when executing data backup of the plant operation data stored in the plant operation data storage unit.

4. A plant operation data acquiring method of managing a history of plant operation data of a control computer controlling a plant operation, comprising:
   receiving and acquiring plant operation data transmitting from the control computer;
   storing a history of the acquired plant operation data in the plant operation data storage unit;
   searching the plant operation data stored in the plant operation data storage unit;
   combining the plant operation data searched from the plant operation data storage unit with a simple data search program for controlling a computer to realize a simple data search function of simply searching the plant operation data in accordance with a backup request, and backing up then using a backup storage medium;
a step of deleting the plant operation data stored in the plant operation data storage unit; and
a step of confirming a backup state,
the step of confirming the backup state including confirming whether or not data backup of the plant operation data is executed before deleting the plant operation data stored in the plant operation data storage unit in the data deletion step; and stopping data deletion of the plant operation data in the data deletion step if data backup is not executed.

* * * * *